United States Patent [19]

Kurata et al.

[11] Patent Number: 4,628,368
[45] Date of Patent: Dec. 9, 1986

[54] METHOD FOR CONTROLLING SUB-SCANNING OF DOCUMENT READING APPARATUS

[75] Inventors: Masami Kurata; Tadashi Yamamoto; Noriyoshi Ishikawa, all of Ebina, Japan

[73] Assignee: Fuji Xerox Co., Ltd., Tokyo, Japan

[21] Appl. No.: 629,724

[22] Filed: Jul. 11, 1984

[30] Foreign Application Priority Data

Jul. 12, 1983 [JP] Japan .................................. 58-126590

[51] Int. Cl.[4] ............................................... H04N 1/10
[52] U.S. Cl. ..................................... 358/293; 358/288
[58] Field of Search ............... 358/280, 288, 293, 294; 250/578

[56] References Cited

U.S. PATENT DOCUMENTS 4,521,813  6/1985  Yoshida et al. ..................... 358/288

*Primary Examiner*—James J. Groody
*Assistant Examiner*—Edward L. Coles
*Attorney, Agent, or Firm*—Spensley Horn Jubas & Lubitz

[57] ABSTRACT

In a method of controlling the sub-scanning of a document reading apparatus the speed, acceleration or deceleration of the reading section is controlled according to the amount of information stored in a buffer memory which temporarily stores information read by the reading section. The values of the movement speeds, accelerations and decelerations are predetermined according to the stored information amount of the buffer memory and at the time of controlling the reading section, one of these values is selected according to the currently stored information amount of the buffer memory. Whereby any vibration in a reading section is prevented to eliminate the irregularity in the sub-scanning of the reading section.

14 Claims, 9 Drawing Figures

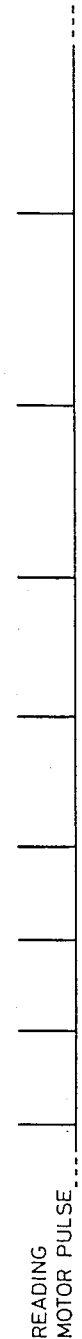
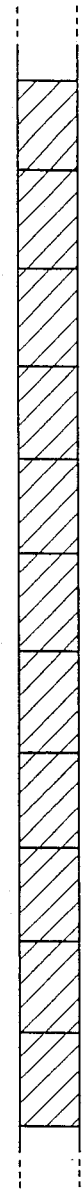
FIG.4(a) READING MOTOR PULSE
FIG.4(b) READING STATE
FIG.4(c) PRINTING STATE (a)

(b)

METHOD FOR CONTROLLING SUB-SCANNING OF DOCUMENT READING APPARATUS

BACKGROUND OF THE INVENTION

1. Field of the Invention

The present invention relates to a method for controlling the sub-scanning of a document reading machine wherein an original document is resolved into picture elements and read to provide a print on the basis of the read picture information.

2. Description of the Prior Art

A digital copying machine of the type in which an original document is resolved into picture elements and read to provide a print on the basis of a picture signal obtained from the reading of the elements, has two functions of reading the document to generate the picture signal and providing a print on the basis of the picture signal. Accordingly, it is considered that such a copying machine can be applied as a composite machine having a combined function of a facsimile and a printer.

In the event where the above digital copying machine is arranged as such a composite machine, however, it requires predetermined data processings including code conversion and thus a waiting time at the time of input and output of the picture information, resulting in that the reading and printing operations of the document must inevitably be effected at a variable speed.

In such a case, since the reading section forms a secondary vibration system having a mass, vibration occurs in the movement of the reading section during switching from one speed to another and this vibration causes the irregularity in the sub-scanning feed of the reading section, whereby the picture quality is deteriorated. FIG. 1 shows a secondary vibration system, in a model form, of the reading section, wherein M is a mass, K is a spring and C is a damper. FIGS. 2(a) and (b) are graphs showing to the reading section with respect to time and shift of the reading section shift with respect to time, showing how vibration occurs when the command speed to the reading section forming such a secondary vibration system abruptly changes from $V_1$ to $V_2$. It will be seen from FIGS. 2(a) and (b) that, when the command speed to the reading section abruptly changes from $V_1$ to $V_2$, the shift X of the reading section with time "t" is as shown in FIG. 2(b), that is, an undesirable vibration takes place in the reading section.

In view of the above circumstances, it is an object of the present invention to provide a method for controlling the sub-scanning of a document reading apparatus which does not cause any vibration in the reading section even during its switching of the speed, whereby the stable feed of a reading section can be achieved.

SUMMARY OF THE INVENTION

In the present invention, the movement speed, acceleration or deceleration of a reading section is controlled according to the amount of information stored in a buffer memory which temporarily stores picture information read by the reading section, to thereby prevent the vibration of the reading section and thus the deterioration of the picture quality. That is, one of N predetermined stepped speeds ($N \geq 2$) is selected according to the stored information amount of the buffer memory to control the movement speed or sub-scanning speed of the reading section to be the selected one.

While the sub-scanning speed is switched, one of 2(N-1) predetermined accelerations and decelerations is selected to control the acceleration or deceleration of the reading section to be the selected one.

BRIEF DESCRIPTION OF THE DRAWINGS

FIGS. 4a–c are timing charts for explaining the sub-scanning control system in accordance with the present invention, in which FIG. 4(a) is a reading motor pulse RMP issued from a motor pulse generator 4, FIG. 4(b) shows a reading state of a reading section 1 and FIG. 4(c) shows a printing state of a printing section 7.

DESCRIPTION OF THE PREFERRED EMBODIMENT

Figure 1:
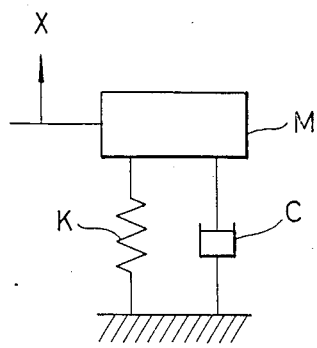
FIG. 1 is an equivalent model of a reading section in a digital copying machine.
Figure 2:
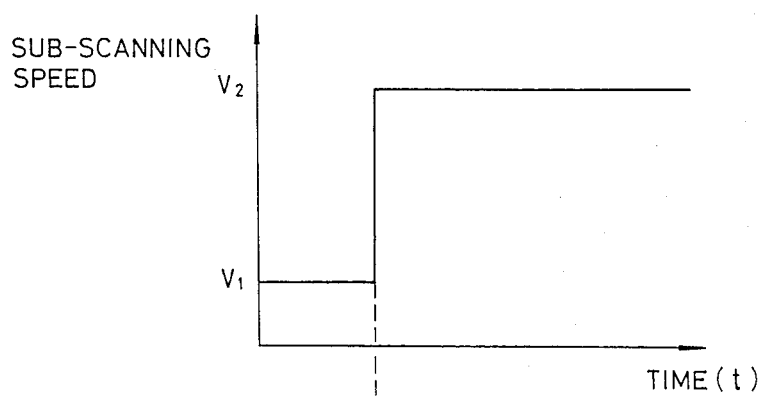
FIGS. 2a and b indicate graphs showing a relation between the command speed and time and a relation between the reading section shift and time, showing how vibration occurs while the sub-scanning speed of the reading section changes.
Figure 2:
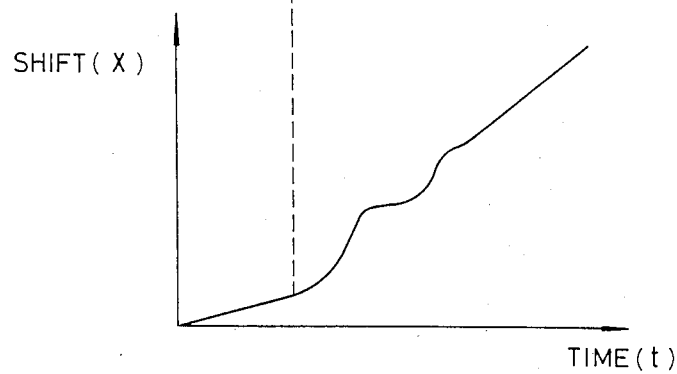
Figure 3:
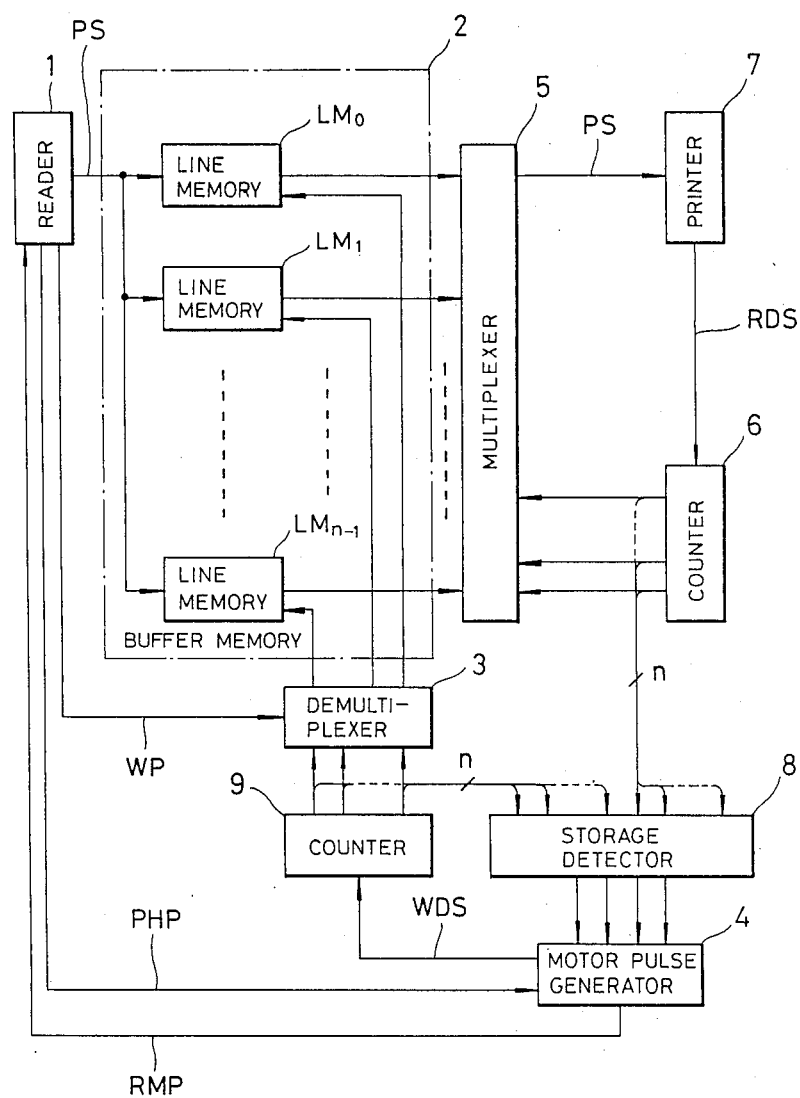
FIG. 3 is a block diagram showing an embodiment of a sub-scanning control system of a document reading apparatus in accordance with the present invention.

There is shown in FIG. 3 a block diagram of an embodiment of a sub-scanning control system of a document reading apparatus in accordance with the present invention, in which a printing section 7 is of a thermal printing type and functions to switch the printing rate per line according to the printing density to reduce the necessary capacity of a power source. That is, when the printing density does not exceed a predetermined value, the printing rate is switched to 2.5 milliseconds per line (2.5 ms/line); while, when it exceeds the predetermined value, it is switched to 5.0 milliseconds per line (5.0 ms/line). More specifically, the printing rate of the thermal printing section is switched depending on the increase or decrease in the number of times to complete printing of one line. When the time necessary for data transfer to the external device is taken into consideration, the printing rate is sometimes beyond 5.0 ms/line.

The reading section 1 moves along a platen (not shown) under control of a pulse motor (not shown) driven by a reading motor pulse RMP generated at a motor pulse generator 4, optically electrically reads an original document on the platen on the line by line basis, and sequentially generates picture signals PS corresponding to the lines. In the illustrated embodiment, the reading rate (main scanning speed) of the reader 1 per line is always 2.5 ms/line. On the other hand, the reader 1 has N steady reader movement speeds or sub-scanning speeds ($N \geq 2$) (in the vertical direction) and selectively switches to one of the N steady movement speed according to the storage condition of a buffer memory 2. In addition, while the sub-scanning speed is switched, the reading sub-scanning operation is accelerated or decelerated with one of the (N-1) accelerations and (N-1) decelerations selected according to the storage condition of the memory 2 to absorb a difference between data reading and printing rates. The relation between the steady sub-scanning speeds $V_1$ to $V_N$ and the accelerations or decelerations (i.e., positive or negative accelerations $\alpha_1$ to $\alpha_{N-1}$ or $\beta_1$ to $\beta_{N-1}$) with respect to the storage condition or storage amount S (the number of available storage lines) of the buffer memory 2, is shown in Table 1 below.

TABLE 1

| Storage S | Steady speed | Acceleration | Deceleration |
|---|---|---|---|
| $S_0 \leqq S < S_1$ | $V_1$ | $\alpha_1$ | — |
| $S_1 \leqq S < S_2$ | $V_2$ | $\alpha_2$ | $\beta_1$ |
| $S_2 \leqq S < S_3$ | $V_3$ | $\alpha_3$ | $\beta_2$ |
| . | . | . | . |
| . | . | . | . |
| . | . | . | . |
| $S_{N-2} \leqq S < S_{N-1}$ | $V_{N-1}$ | $\alpha_{N-1}$ | $\beta_{N-2}$ |
| $S_{N-1} \leqq S < S_N$ | $V_N$ | — | $\beta_{N-1}$ |

For example, if the available storage S of the memory 2 is $S_1 \leqq S < S_2$, then the sub-scanning steady speed is selected to be $V_2$. While the steady speed is switched from $V_1$ to $V_2$, the reader 1 is controllably accelerated with the selected positive acceleration $\alpha_1$. While the steady speed is switched from $V_3$ to $V_2$, the reader is decelerated with the selected negative acceleration $\beta_2$. The selective control of the steady speed, acceleration and deceleration is effected by the motor pulse generator 4. More specifically, the period of the reading motor pulse RMP generated from the generator 4 corresponds to the speed of the reader 1, and the rate of change in the period of the pulse RMP corresponds to the acceleration or deceleration of the reader 1.

In FIG. 3, the reader 1 reads picture information from a not shown original document and sequentially sends it at a rate of 2.5 ms/line to the buffer memory 2. The memory 2, in this embodiment, comprises "n" line memories $LM_0$ to $LM_{n-1}$ each capable of storing the picture information corresponding to one line. That is, the picture information of the each line is applied from the reader 1 to each of the line memories $LM_0$ to $LM_{n-1}$. One of the line memories $LM_0$ to $LM_{n-1}$ of the each line picture information to be stored form the reader 1 is determined on the basis of the outputs of a demultiplexer 3 in the following manner.

In addition to the line picture information signal, the reader 1 also generates a line synchronizing pulse PHP and a write pulse WP in synchronism with the pulse PHP to apply the pulse PHP to the motor pulse generator 4 and the pulse WP to the demultiplexer 3. The pulse generator 4 receiving the pulse PHP, generates the reading motor pulse RMP on the basis of the amount of picture information stored in the buffer memory 2 to control the reading sub-scanning speed, and applies a write request signal WDS to a counter 9 in synchronism with the generated pulse PHP. The counter 9 consists of binary counters of bit configuration capable of counting a value up to "n" and counts the write request signal WDS. The outputs of the counter 9 are supplied to the demultiplexer 3 and a storage detecting circuit 8 to be described later. The demultiplexer 3 decodes the outputs of the counter 9 into "n" line outputs at a timing of receiving the write signal WP from the reader 1, and applies these decoded outputs to the respective "enable" terminals of the line memories $LM_0$ to $LM_{n-1}$ to select one of the line memories for the each line picture information to be stored therein from the reader 1. That is, the line memories $LM_0$ to $LM_{n-1}$ in the buffer memory 2 sequentially operate in response to the counted value of the counter 9 to sequentially store the each line picture information from the reader 1.

The outputs of the line memories $LM_0$ to $LM_{n-1}$ are applied to a multiplexer 5 which in turn sequentially selects the outputs of the line memories $LM_0$ to $LM_{n-1}$ to send the selected output to the printing section 7. As explained earlier, the printer 7 is of a thermal printing type in which its printing rate can be switched to either one of 2.5 ms/line and 5.0 ms/line depending on the printing density of each line (the percentage of black printed dots). In the thermal printing section 7, as soon as it finishes printing corresponding to one line, it generates a read request signal RDS.

The sequential selection of the outputs of the line memories $LM_0$ to $LM_{n-1}$ in the multiplexer 5 is carried out on the basis of the read request signal RDS issued from the printer 7. More specifically, the read request signal RDS issued from the printer 7 is applied to the counter 6 which has the same bit configuration as the above-mentioned counter 9. The counter 6 counts the signal RDS and generates selection signals to select the read line memories in the multiplexer 5. That is, the counted value of the counter 6 is applied to the multiplexer 5 to determine one of read line memories to be sent to the printer 7 on the basis of the count value. In other words, each time the printer 7 issues the read request signal RDS, the multiplexer 5 sequentially selects the outputs of the line memories and sends the selected one to the printer 7. The counted value of the counter 6 is also applied to the storage detecting circuit 8. The storage detector 8 subtracts the counted value (the number of lines read from the memory 2) of the counter 6 from the counted value (the number of lines stored or written into the memory 2) of the counter 9 to detect the line storage amount.

The counters 6 and 9 are both designed to return to zero after reaching the count value (n-1). Accordingly, when the counted value of the counter 6 is larger than that of the counter 9, the counter 9 places "1" at the bit higher than the most significant bit (MSB) to perform the above-mentioned subtraction. In this manner, the storage detecting circuit 8 always detects the amount of picture information being stored in the memory 2, and applies the detected output to the motor pulse generator 4. On the basis of the detected output of the detector 8, the generator 4 generates the reading motor pulse RMP and the write request signal WDS.

FIG. 4 is a timing chart showing the relationship between the reading operation of the reader 1 and the printing operation of the printer 7. In the drawing, FIG. 4(a) is the reading motor pulse RMP issued from the motor pulse generator 4, FIG. 4(b) shows the reading state of the reader 1 and FIG. 4(c) shows the printing state of the printer 7.

The reading operation is always performed at a constant reading rate of 2.5 ms/line, but the printing operation is done at a printing rate of 2.5 ms/line (zones designated by A in the printing state of FIG. 4(c)) or 5.0 ms/line (zones designated by B in the printing state of FIG. 4(c)). As the printing rate is shifted from 2.5 ms/line to 5.0 ms/line, the information storage amount of the memory 2 increases and therefore the period of the reading motor pulse RMP increases.

Figure 5:
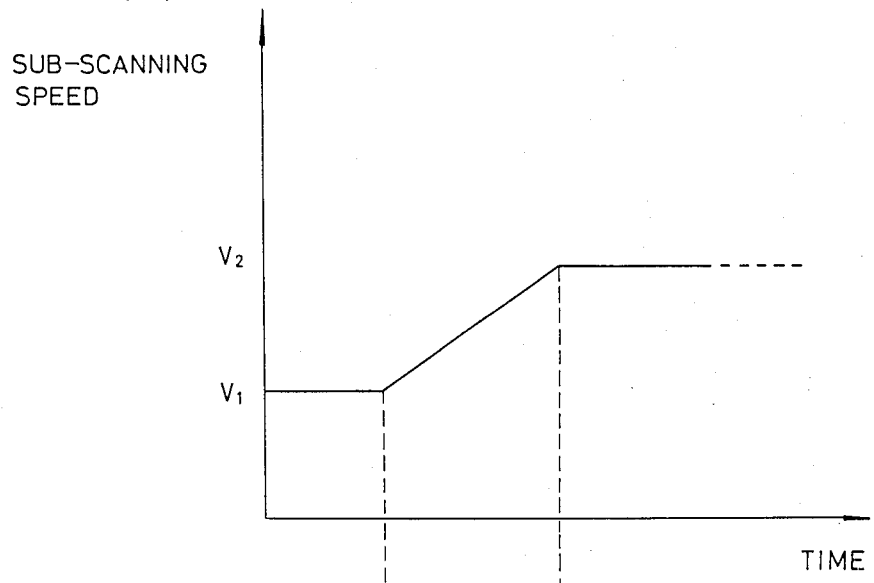
FIGS. 5a–b indicate graphs showing how the reading section shifts while the sub-scanning speed changes according to the sub-scanning control system of the present invention.
Figure 5:
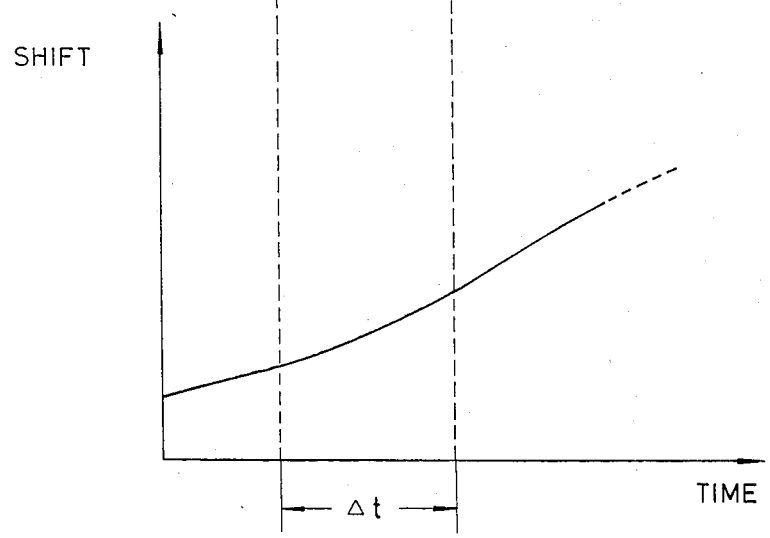

FIG. 5 is a graph showing how the reader 1 shifts while the reading sub-scanning speed is changed from $V_1$ to $V_2$. Since the change of the sub-scanning speed from $V_1$ to $V_2$ is gradually made with the acceleration $\alpha_1$ during a time period $\Delta t$ (refer to FIG. 5(a)), the reader 1 can smoothly shift while not causing any vibration in the reader shift (refer to FIG. 5(b)). The same explanation will be applied also to an incremental or decremental change in the sub-scanning speed between other predetermined steady levels.

The present invention will not necessarily require such an arrangement including the control of acceleration and deceleration over the sub-scanning operation as has been explained in connection with the above embodiment. For example, a plurality of such reading steady speeds may be set to allow the selection of the steady speeds alone, so long as the setting does not cause any feed variation in the reader 1.

We claim:

1. A method for controlling the movement speed of reading means in a document reading apparatus, said reading means having a certain weight and moving along a platen on which a document is supported so as to read picture information on said document in a line by line manner, said read picture information being temporarily stored in a buffer memory for subsequent utilization, comprising the steps of:
   detecting the amount of picture information currently stored in said buffer memory not yet utilized, and
   controlling said movement speed of said reading means according to said detected picture information to minimize the vibration of said reading means.

2. The method as set forth in claim 1, wherein said movement speed controlling step comprises the steps of:
   predetermined a plurality of said movement speeds;
   associating amounts of picture information stored in said buffer memory to each one of said predetermined plurality of speeds;
   selecting a speed among said plurality of predetermined speeds based on the amount of picture information detected in said picture information detecting step; and
   controlling the movement speed of said reading means according to said selected speed.

3. The method as set forth in claim 1, wherein said movement speed controlling step comprises the steps of:
   predetermining a plurality of accelerations and decelerations of said reading means;
   associating amounts of picture information stored in said buffer memory to each one of said predetermined accelerations and decelerations;
   selecting an acceleration or deceleration among said plurality of predetermined accelerations and decelerations based on the amount of picture information detected in said picture information detacting step; and
   controlling the acceleration or deceleration of said reading means according to said selected acceleration or deceleration.

4. The method as set forth in claim 1, wherein said movement speed controlling step comprises the steps of:
   predetermined N stepped speeds and 2(N-1) stepped accelerations or decelerations where N is greater than or equal to 2, of said reading means;
   associating amounts of picture information stored in said buffer memory to each one of said N predetermined speeds and to each one of said 2(N-1) predetermined accelerations or decelerations;
   controlling said reading means to move at one of said N predetermined speeds according to the amount of picture information detected in said picture information detecting step by accelerating or decelerating said reading means at one of said 2(N-1) predetermined accelerations or decelerations associated with said amount of picture information detected in said picture information detecting step.

5. A document reading apparatus comprising:
   a platen for supporting a document thereon;
   a reading means having a certain weight and moving along said platen for reading picture information on said document in a line by line manner;
   a buffer memory for storing picture information read by said reading means and for successively outputting said stored picture information into a recording means;
   means for detecting the amount of picture information currently stored in said buffer memory; and
   means for controlling movement speed of said reading means according to the amount of picture information detected by said detecting means.

6. The apparatus as set forth in claim 5, wherein said controlling means comprises:
   memory means for storing a plurality of predetermined speeds of said reading means;
   means for associating amounts of picture information stored in said buffer memory to each of said plurality of speeds;
   read-out means for reading out one of said plurality of predetermined speeds from said memory means according to the amount of picture information in said buffer memory detected by said detecting means; and
   control means for controlling movement speed of said reading means according to the speed read out by said read-out means.

7. The apparatus as set forth in claim 5, wherein said control means comprises:
   memory means for storing a plurality of predetermined accelerations and decelerations for said reading means;
   means for associating amounts of picture information stored in said buffer memory to each one of said plurality of accelerations and decelerations;
   read-out means for reading out one of said plurality of predetermined accelerations and decelerations from said memory means according to the amount of picture information in said buffer memory detected by said detecting means; and
   control means for controlling acceleration or deceleration of said reading means according to said read out acceleration or deceleration.

8. The apparatus as set forth in claim 5, wherein said controlling means comprises:
   memory means for storing N stepped speeds and 2(N-1) stepped accelerations or decelerations where N is greater than or equal to 2, for said reading means;
   means for associating amounts of picture information stored in said buffer memory to each one of said N speeds and to each one of said 2(N-1) accelerations or decelerations;
   read-out means for reading out one of said N speeds and one of said 2(N-1) accelerations or decelerations according to the amount of picture information stored in said buffer memory detected by said detecting means; and
   control means for controlling said reading means to move at said speed read out by said read-out means by accelerating or decelerating said reading means at said acceleration or deceleration read out by said read-out means.

9. In a digital copying machine having a moveable document reader for reading a document, and a memory for storing the read information on a line by line basis, and a printer for printing out the contents of said memory, a method for controlling the speed of said document reader, comprising the steps of:
determining the lag of said printer in printing said stored information based on the amount of read information in said memory not yet printed out;
controlling said speed based on said determined lag.

10. A method for controlling the speed of a document reader according to claim 9 wherein said speed is controlled by establishing a reading motor pulse rate ascertained in response to amounts of read information in memory not yet printed.

11. A method for controlling the speed of a document reader according to claim 10 wherein said pulse rate is controlled so that said document reader is imparted vibration-minimizing values of velocity and acceleration.

12. A method of controlling the speed of a document reader according to claim 11 wherein said vibration-minimizing values of velocity and acceleration are selected in accordance with preestablished tabular relationships between said values and amounts of read and stored information not yet printed.

13. An apparatus for controlling the speed of a document reader, comprising:
a moveable reader with a variable speed for use with a scanner for scanning line information on a document;
a buffer memory, said buffer memory having independent separate line memories;
means for writing said scanned line information in a line-by-line manner into said line memories;
means for printing out said stored line information from said line memories;
means for determining the number of said line information stored in said line memories that are not yet printed; and
means for controlling the speed of said document reader in accordance with the determined amount of stored line information not yet printed.

14. An appararatus as claimed in claim 13 wherein said means for controlling the speed further comprises means for storing a table of values of velocities, accelerations, and decelerations, said values being selected in accordance with said determined amount of stored line inforamtion not yet printed to control the speed of said document reader to minimize the vibration of said document reader while reading.

* * * * *